Aug. 10, 1965 N. A. KAMMILLER ETAL 3,200,348
FREQUENCY GENERATOR HAVING CONTROL CIRCUITS FOR AMPLITUDE REGULATION AND OVERLOAD PROTECTION
Filed March 21, 1962
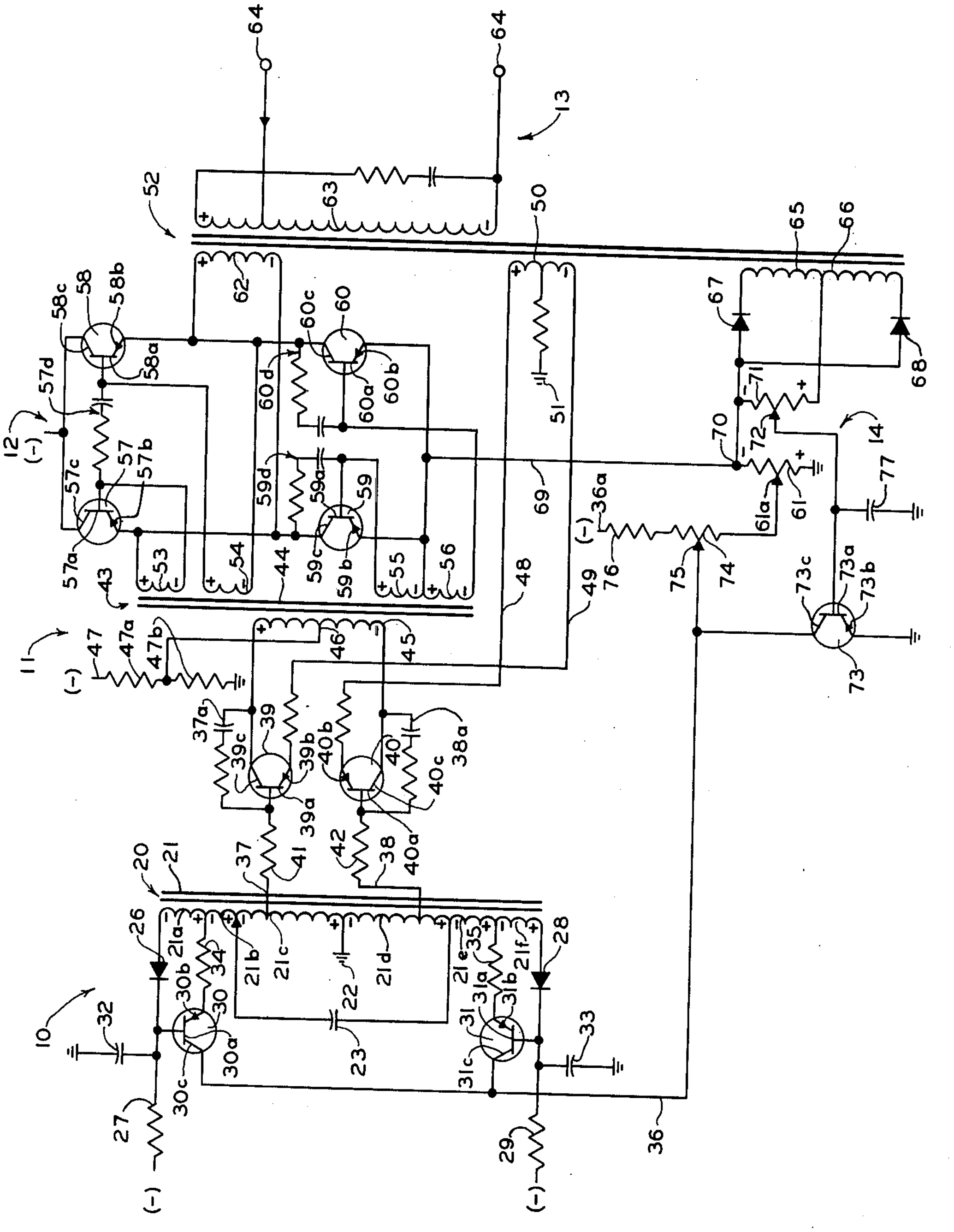
INVENTORS
NEIL A. KAMMILLER
STEPHEN L. MERKEL
BY John Howard Smith
ATTY.

3,200,348

FREQUENCY GENERATOR HAVING CONTROL CIRCUITS FOR AMPLITUDE REGULATION AND OVERLOAD PROTECTION

Neil A. Kammiller, North Olmsted, and Stephen L. Merkel, Cleveland, Ohio, assignors to Lorain Products Corporation, a corporation of Ohio Filed Mar. 21, 1962, Ser. No. 181,362
11 Claims. (Cl. 331—62)

Our invention relates generally to frequency generators and is directed more particularly to a frequency generator adapted for supplying power for telephone systems.

In the operation of telephone offices it is the usual practice to utilize a D.-C. source such as the office battery. While commercial A.-C. source is also available, it has been found that those devices which operate directly from battery are more reliable from the standpoint of continuity of service since the battery is available to supply the necessary power in the event of a breakdown in the commercial A.-C. supply.

With the foregoing in mind, it is an object of the invention to provide a frequency generator, preferably having transistor circuitry, which operates efficiently from a D.-C. source such as office battery without impressing too heavy a drain on the source.

In the design and operation of a telephone office, it is important that there be uniformity in the character and quality of all signals, particularly those directed to the subscriber. The maintenance of this uniformity is made generally more difficult by the fact that in the normal operation of a telephone exchange there is a wide variation of load between those periods characterized as "peak" periods, such as that during a business day at an exchange located in a commercialized area, and the low load periods such as those that occur from about midnight to 2:00 a.m.

It is therefore, an important object of our invention to provide a frequency generator of the above character having novel circuitry whereby the output voltage and thus the strength of the output signal is well regulated in the presence of a wide variation in load demand as exemplified by the two extreme periods of exchange operation set forth above.

Still another important object of our invention is to provide an improved frequency generator having protected circuitry whereby operation of the device ceases in the face of detrimental external circuit conditions such as excessive overload, short circuit, trip battery short or cross connection of one generator with another.

We have found that in the generation of alternating power for the purpose of, for instance, ringing telephone subscribers' bells, attention must always be directed to the elimination of circuit noise which interferes with the communicating function of the telephone system. In this regard, it has been found that as the alternating signal approaches a sine wave in form, a reduction in circuit noise is realized.

Accordingly, it is an important object of our invention to provide a frequency generator which operates from office battery and which includes improved circuitry for producing a sinusoidal output for ringing subscribers' bells.

It is still another object of our invention to provide an improved frequency generator which is inherently self-protected against excessive overload due to the automatic, materially reduced operation of an oscillator provided therein if load impedance drops below a prescribed value.

Still another object of our invention is to provide an improved generator of the above character which comprises static parts throughout and this is not subject to wear or deterioration with use and entails a minimum of maintenance.

A further object of our invention is to provide a novel control circuit having the dual function of regulating the voltage output of the entire unit, this same circuitry being utilized to protectively cut-off the oscillator in response to short circuit as stated above.

More specifically, it is an object of our invention to provide a ringing generator which includes a novel arrangement of an oscillator operable from a D.-C. source, a driver stage, a power bridge, an output terminal system and a control circuit responsive to current flow through the power bridge to, in turn, control the output of the oscillator.

It is a further object of the invention to provide a high impedance power source for the power bridge and an improved negative feedback arrangement from the output of the power bridge in a manner to control the gain of the driver section, thereby providing from the generator, a satisfactory sine wave output having low harmonic distortion and which is unaffected by cross-over distortion.

Other objects and advantages of the invention will become apparent from the following description and accompanying drawing in which the single figure shows a schematic arrangement of a ringing generator embodying our invention.

In general terms, as shown in the figure, an exemplary circuit embodying the invention includes an oscillator section 10, an amplifier including a driver section 11 and a power bridge section 12 together with an output terminal section 13 and a control section 14. Our frequency generator is typically connected into telephone systems having a positive grounded battery supply as can be seen in the figure.

The oscillator section 10 receives power from a D.-C. source such as a telephone office battery and develops a sinusoidal output which is fed to the driver stage 11. This sinusoidal output is, in turn, fed into the power bridge 12 and thence, by transformer action, to the output terminal system 13. As will be seen presently, the magnitude of current flow in the power bridge circuit 12 is reflected in the control circuitry of section 14 which, in turn, regulates the operation of the oscillator to control the output of the amplifier into the output terminal system.

The oscillator section comprises generally inductor 20 having a core 21 and a winding comprising sections **21*a*, 21*b*, 21*c*, 21*d*, 21*e*, and 21*f*. The winding sections 21*c* and 21*d* comprise the coil of a tank circuit which is completed by the provision of a capacitor 23. As shown, the upper lead from the capacitor may be provided with an adjustable tap 23*a* on the coil. The lower lead of capacitor 23 is connected between coil sections 21*d* and 21*e***.

Coil section **21*a* has its upper end, as shown in the figure, connected to negative battery through diode 26 and resistor 27**.

Similarly, coil section **21*f*, at its lower end, is connected through diode 28 and resistor 29 to negative battery. The current provided through diodes 26 and 28 by resistors 27 and 29 supplies forward bias to make oscillator transistors 30 and 31 conduct D.-C. current from ground 22 to negative battery as at 36*a*. Oscillator transistors 30 and 31 each have, respectively, base electrodes 30*a* and 31*a*, emitter electrodes 30*b* and 31*b* and collector electrodes 30*c* and 31*c*. The base lead of each transistor 30 and 31 is connected to the respective coil lead at the junction of the respective diode and resistor while the emitter electrode of each transistor is connected to the other side of the coil sections 21*a* and 21*f*** respectively.

If desired, parasitic oscillations may be reduced by the provision of capacitors 32 and 33 connected respectively between ground and the base electrode of the respective transistor.

When the respective base electrode leads of the transistors and, thus the respective ends of the coil of inductor 20 are connected to battery, with resistors 28 and 29 and diodes 26 and 28 in the circuit as forward bias, one or the other of the transistors 30 or 31 will tend to dominate the other due to the inherently different characteristics found in all transistors. Assuming transistor 30 is that which conducts first, its base electrode and the upper end of the coil of inductor 20 will become more negative while the base electrode of transistor 31 and the lower end of the coil will tend to become more positive. Under these circumstances, the connection between ground 22 and negative battery, as shown at 36*a*, will be established through transistor 30 causing capacitor 23, due to the flow of current in the tank circuit, to charge. This condition prevails until capacitor 23 has charged and discharged whereupon, polarities of the coil sections will reverse from the polarities shown and the coil will become less negative at the upper end and more negative at the lower end. This causes transistor 30 to shut off and transistor 31 to conduct, reversing the oscillation in the tank coil. This operation continues and the oscillations are stabilized by the presence of resistors 34 and 35 in the emitter leads of transistors 30 and 31 respectively and by the alternate saturation of the transistors 30 and 31.

The emitter-collector circuits of transistors 30 and 31 are completed by the junction of the collectors of the respective transistors to the lead 36 which, in turn, is connected to minus battery at 36*a* through voltage dividing means to be explained presently as shown in the control circuit section 14. Hence, the conducting activity of the transistors 30 and 31 establishes a current path between ground 22 and the negative battery 36*a* alternately through coil sections 21*c* and 21*d*. As shown in the figure, leads 37 and 38 are tapped into coil sections 21*c* and 21*d*, each being symmetrically disposed with respect to the center tap to ground 22.

The driver section of the generator comprises transistors 39 and 40 each having respectively, base electrodes 39*a* and 40*a*, emitter electrodes 39 *b* and 40*b* and collector electrodes, 39*c* and 40*c*. The base electrodes are connected respectively to the leads 37 and 38 through respective resistors 41 and 42 which serve to suppress parasitic oscillations and to aid in establishing proper bias for the driver stage 11.

Transistors 39 and 40 are provided with base to collector R-C networks 37*a* and 38*a* respectively which serves to suppress parasitic oscillations.

A winding 45 of the driver stage 11 serves as a primary winding for a transformer 43, the secondary windings of which comprise coil sections 53, 54, 55, and 56. The outer ends of the coil 45 are connected to the respective collectors 39*c* and 40*c* of transistors 39 and 40 while a mid-tap 46 is connected to negative battery as at 47 through a voltage divider comprising resistors 47*a* and 47*b*. This voltage divider serves to protect the driver transistors 39 and 40 against excessive voltage.

The transistor connections for the driver stage are completed by leads 48 and 49 which are connected between emitters 39*b* and 40*b* and the ends of a feedback coil 50 having a center tap connected to ground as at 51. This coil 50 comprises a secondary winding on transformer 52 to be described presently.

The power bridge 12 includes transistors 57, 58, 59, and 60 having, respectively, base electrodes 57*a*, 58*a*, 59*a*, and 60*a*, emitter electrodes 57*b*, 58*b*, 59*b*, and 60*b* and collector electrodes 57*c*, 58*c*, 59*c*, and 60*c*. The collectors of transistors 57 and 58 have a common connection to negative battery while the emitter of transistors 59 and 60 have a common connection to ground through potentiometer 61. This potentiometer 61 is in effect a load current responsive device which, as will be seen presently, controls oscillator 10 to provide output voltage regulation. The emitter 57*b* of transistor 57 is connected to the collector 59*c* of transistor 59, these electrodes, having a common connection to the lower end of a primary winding 62 of the output transformer 52, while the emitter 58*b* of transistor 58 is connected to the collector electrode 60*c* of transistor 60, these electrodes having common connection to the upper end of the coil section 62 as shown in the figure. Suitable R-C circuits 59*d* and 60*d* between base and collector electrodes are provided for transistors 59 and 60 respectively to suppress parasitic oscillations while a similar suppressor 57*d* is provided for the same purpose between the base electrodes of transistors 57 and 58.

The connections for the power amplifier are completed by the provision of secondary winding section 53 of transformer 43 across the base and emitter electrodes of transistor 57, the coil section 54 across the base and emitter electrodes of transistor 58, the coil section 55 across the base and emitter electrodes of transistor 59 and the coil section 56 across the base and emitter electrodes of transistor 60. These connections and the coil sections are so arranged that during the operation of the device, the base electrodes of transistors 57 and 60 are driven more negative than the emitter electrodes thereof, so that these transistors conduct simultaneously while at this time the base electrodes of transistors 58 and 59 are being driven positive so they do not conduct. This operation is shown by the polarities of coil sections 53, 54, 55, and 56 of transformer 43. The criss-cross, alternate conducting and non-conducting condition through the emitter-collector path of each pair of transistors between positive ground and negative battery impresses an alternating signal across primary winding 62 of power transformer 52.

The alternating signal on winding 62 induces a potential on secondary winding 63 which is part of the output terminal system 13 and on winding 50 which provides a negative feedback for the driver stage. When the signal on the base of transistor 39 goes increasingly negative, and the signal on the base of transistor 40 goes increasingly positive, the primary winding 62 of transformer 52 will cause the upper end of winding 50 to be positive going while the lower end is negative going. Under these conditions, winding 50 imparts to the emitter 39*b* of transistor 39, a negative going potential which is in phase with the negative going base electrode voltage and, therefore, reduces the gain of the circuit in which transistor 39 operates.

When the polarity of the signal on the base 39*a* of transistor 39 reverses and becomes positive going, it will be clear that the polarity of winding 50 has also reversed and a positive going potential is being applied to the emitter 39*b* of transistor 39 and is thus degenerative in that it is a negative feedback tending to reduce the output of transistor 39. Transistor 40, having its emitter connected to the opposite end of winding 50 from the emitter of transistor 39, derives its negative feedback in the same manner, but operates in phase opposition to that described above. It will be understood, of course, that the above conditions are reversed by reversal of tank circuit operation.

With this arrangement, therefore, it will be seen that there is provided negative feedback to the driver transistors, this feedback being in phase with the input to those transistors. Variation in the gain of the driver stage 11 by negative feedback from winding 50 in response to variations in output voltage, regardless of their cause, is therefore a contributing factor in maintaining a regulated output for the circuit. This negative feedback creates a high impedance in the driver stage 11 thereby preventing crossover distortion in the power amplifier stage 12. This arrangement, in function, is important to the preservation of the sinusoidal signal throughout the circuit, the sinusoidal signal, in turn, being important in telephone circuits, as stated previously. In view of the foregoing, it will be seen that the output terminals 64 will have impressed upon them the desired sinusoidal signal.

With the circuitry described, satisfactory operation is maintained so long as no wide variation in load demand occurs and so long as the generator or any of the external circuitry associated with it is not subjected to short circuits and the like. Generally speaking, however, such ideal conditions do not prevail in actual practice. As indicated previously, for satisfactory and reliable operation in the field, it is essential that the output voltage of the generator be closely regulated within certain predetermined limits, whereby this regulated magnitude of voltage is present at the output in spite of the variable loads such as the current demand, for instance, at heavy "peak" periods or at times of area disaster. Additionally, as indicated previously, for satisfactory usage in a telephone system, the generator must be protected against damage occurring from short circuits or the like.

To the end that the above advantages may be realized, I have provided herein a control circuit 14, which, in its entirety serves to regulate the output voltage in a manner to be described and also ensures cut-off at a predetermined magnitude of overload above the rated load of the generator.

Generally speaking, the control circuit affords output voltage regulation with change in load throughout the normal operation of the device. The control circuit maintains output voltage within a specified output range so that during normal operation, load variation is not reflected at the output terminal 64 as an output voltage change. In other words, the control circuit 14 in its association with the oscillator section 10 and power bridge 12 is such that both voltage regulation during normal operation and also cut-off upon excessive overload are recognized by the control circuit as distinctly different conditions. However, the voltage regulating action of the control circuit is such that it is closely co-ordinated with the cut-off function of the circuit.

It should be noted that, though oscillator cut-off is referred to here, the oscillator section does not necessarily shut down completely but may provide a small, constant magnitude sensing output at all times so that there is a signal voltage present on the primary winding 62 of the output transformer when the oscillator operation is reduced. This signal voltage sustains the operation of the control circuit by sensing the impedance of the load. As long as the impedance of the load remains below a prescribed value, the control section will prevent the oscillator from returning to normal operation.

The control circuit 14, as shown herein, comprises a secondary winding on the output transformer 52. This secondary includes winding sections 65 and 66, which are connected, respectively, through diodes 67 and 68 to the potentiometer 71. The winding sections 65 and 66, together with the potentiometer 71 comprise an output voltage responsive network and it will be seen that the diodes 67 and 68 with windings 65 and 66 constitute a full wave rectifier. The potentiometer 71 includes a wiper arm 72 connected to the base electrode 73*a* of transistor 73. The setting of wiper arm 72 determines the power output at which the oscillator will become cut off.

The transistor 73 is provided with a ground connected emitter 73*b* and a collector 73*c* which is connected to lead 36 from the oscillator transistors. The lead 36 is also connected to the voltage regulator circuit as will be described presently. In the circuit, the transistor 73 serves as switch means for control of the oscillator.

The voltage regulator includes, in addition to the ground connected potentiometer 61, a voltage divider network comprising potentiometer 74 having a wiper arm 75 together with a resistor 76 which is, in turn, connected to negative battery at 36*a*. The wiper arm 75 provides voltage adjustment of the generator output.

The negative feedback from winding 50 to the driver stage 11 operates, in conjunction with the voltage regulator circuit of the control section 14, to maintain the output voltage of the generator at a constant value. At any drop of output voltage, the negative feedback voltage from winding 50 also drops. This affords a high output from the driver stage thereby to regulate the output voltage at terminal 64. Conversely, at any tendency of the output voltage to rise, the negative feedback voltage from winding 50 rises. This affords a lower output from the driver stage to regulate the output voltage at terminals 64. The action of winding 50 stabilizes the output voltage enabling the generator to maintain substantially constant output voltage over a wide range of normal load conditions.

This voltage regulator circuit of the control section 14 aids the negative feedback in maintaining the constant voltage output in spite of normal load variations. An increase in load current will result in an increased current through potentiometer 61 causing its wiper arm 61*a* to become increasingly negative. In effect, the potentiometer 61 is load current responsive means. The negative going potential on wiper arm 61*a* causes wiper arm 75 and the collectors 30*c* and 31*c*, since they are connected by lead 36 to the wiper arm 75, to become more negative. Hence, it will be seen that the collector voltage of oscillator transistors 30 and 31 varies according to the voltage across the potentiometer 61 which is, in turn, controlled by the load current therethrough.

The increased emitter to collector voltage across the oscillator transistors 30 and 31 caused by the increased negative voltage on the collectors 30*c* and 31*c* results in increased oscillator output, which, after amplification by the driver stage 11 and the power bridge 12, increases the voltage across winding 62.

The cut-off circuit of the control section 14 reduces the output of the oscillator 10 to a very low level when a predetermined power output is reached or in case of a short circuit or other external overload condition. The voltage induced by the primary 62 on windings 65 and 66, which are connected as a full wave rectifier circuit by means of diodes 67 and 68, is applied to potentiometer 71. The upper end of potentiometer 71 is negative with respect to the lower end and since the upper end is connected to junction 70, the voltages on potentiometers 61 and 71 are series opposing for the loop consisting of common positive ground, potentiometer 61, the portion of potentiometer 71 above the wiper arm 72, transistor base 73*a*, emitter 73*b* and ground.

As the load increases, the current from common positive, through resistor 61, lead 69, the bridge amplifier 12 and primary 62, to negative battery increases causing a greater voltage across potentiometer 61.

When the voltage on potentiometer 61 increases to a greater value than the voltage between the wiper arm 72 of potentiometer 71 and junction 70, the wiper arm 72 becomes negative with respect to ground causing current flow from emitter 73*b* to the base 73*a*. This emitter to base current forward biases the transistor 73, turning it on and current flows from common positive, through the emitter 73*b* to collector 73*c*, the upper part of potentiometer 74 and resistor 76 to negative battery at 36*a*.

Transistor 73, when turned on by the action of the cut-off circuit, placees wiper arm 75 and, therefore, the collectors 30*c* and 31*c* of the oscillator transistors essentially at ground potential, the collectors 30*c* and 31*c* being connected to wiper arm 75 by lead 36. Thus, when the cut-off circuit turns transistor 73 on, all but a fraction of the negative D.-C. supply is removed from the collectors of the oscillator transistors, thereby reducing the output of the oscillator to a very low level.

When transistor 73 begins to conduct as explained above the voltage to collectors 30*c* and 31*c* is reduced to, in turn, reduce the voltage across the output transformer 52. This action, in turn, reduces the voltage across windings 65 and 66 and hence, across potentiometer 71.

Since the voltage on potentiometer 71 tends to cut-off the transistor 73, any reduction in this voltage tends to render the transistor more conducting. This action results in a very abrupt cut-off when the transistor 73 begins to conduct.

In order that generator cut-off will occur at the same volt-ampere output value for both resistive and reactive loads, a capacitor 77 is provided from base 73*a* to ground. The capacitor 77 with the impedances of potentiometers 61 and 71 acts as an integrating circuit for the potentials developed on potentiometers 61 and 71.

Due to the R-C time constant set up in the control circuit by the introduction of capacitor 77, the sensing action of the oscillator and control circuit sections, should an overload occur, will be somewhat different than that previously described. With capacitor 77 in the circuit, transistor 73 will conduct only until capacitor 77 is discharged by emitter to base current flow, whereupon, transistor 73 will shut off. When this happens, the oscillator output begins to increase from its low level but the resultant voltages on potentiometers 61 and 71 cause transistor 73 to conduct thereby reducing the oscillator output again. This sampling, sensing operation continues as long as the load impedance is below a predetermined value.

What we claim is:

1. The combination in a frequency generator adapted to operate from a D.-C. source and having an oscillator, an amplifier, an output transformer provided with a primary and secondary windings and means for connecting the output of the oscillator across the primary winding of said output transformer through said amplifier, a load being connected across one of said secondary windings; of a control circuit including output voltage responsive means, load current responsive means and switch means, unilateral conducting means connecting said output voltage responsive means in energizing relationship with another of said secondary windings, means for connecting said load current responsive means serially in the current path in said amplifier, a unidirectional voltage source, means for connecting said unidirectional voltage source between said load current responsive means and said oscillator to vary the output of said oscillator in accordance with changes in the voltage across said load current responsive means, means for connecting said output voltage responsive means and said load current responsive means in circuit relationship to produce a difference voltage on said output voltage responsive means, means for connecting said output voltage responsive means to said switch means to control the conductance of said switch means and means for connecting said switch means to said oscillator to de-energize the oscillator when the impedance of said load falls below a predetermined value.

2. The combination in a frequency generator having an oscillator, means for connecting the oscillator to a D.-C. source, an amplifier, means for connecting the amplifier to said oscillator, an output transformer having a primary and secondary windings, means for connecting said primary winding to the amplifier and means for connecting said secondary windings to a load; of a control circuit section for regulating the output voltage of the generator with respect to changes in voltage across said primary winding and for shutting off said oscillator upon the flow of a predetermined value of load current, said control circuit section including output voltage responsive means, load current responsive means and switch means, unilateral conducting means connecting said output voltage responsive means in energizing relationship with another of said secondary windings, means for connecting said load current responsive means in circuit relationship with said amplifier, means for connecting said voltage responsive means and said load current responsive means in series opposition to produce a difference voltage on said output voltage responsive means, means for connecting said switch means to said oscillator to de-energize the same when said switch means is closed, a unidirectional voltage source connected between said load current responsive means and said oscillator to control the operation thereof in accordance with variations in voltage across said load current responsive means, connecting means between said voltage responsive means and said switch means for closing the same when the voltage across said load current responsive means is greater than the voltage across said voltage responsive means.

3. In a frequency generator adapted to operate from a D.-C. source and having an oscillator, an amplifier, an output transformer provided with a primary and secondary windings and means for connecting the said oscillator across said primary winding through said amplifier; a control circuit section including output voltage responsive means, rectifying means, means for connecting said rectifying means between said output voltage responsive means and one of said secondary windings to energize said output voltage responsive means, load current responsive means connected in series circuit relationship with said output voltage responsive means, switch means, means for connecting said load current responsive means between said D.-C. source and said amplifier to sense the load current, means for connecting said voltage responsive means to said switch means to vary the conductance thereof in accordance with the ratio of voltages on said load current responsive means and said voltage responsive means, means for connecting said switch means to said oscillator to energize and de-energize the same in accordance with the conducting condition of said switch means, and means for connecting said load current responsive means to said oscillator, said means including a unidirectional voltage source whereby the output thereof varies in accordance with the voltage across said load current responsive means.

4. The combination with a frequency generator adapted to operate from a D.-C. source and including an oscillator having an input connected to said source, an output transformer provided with a primary winding and secondary windings, an amplifier and means for connecting the output of said oscillator across the primary winding on said output transformer through said amplifier; of a control circuit section including voltage responsive means comprising one of the secondary windings and unidirectional means, and means for connecting said unidirectional means to said secondary winding to provide a D.-C. output from said voltage responsive means, load current responsive means, means for connecting said load current responsive means in series with the current path in said amplifier, means for connecting said D.-C. output of said voltage responsive means in series with the output of said load current responsive means, to produce a difference voltage on said output voltage responsive means, switch means, means for connecting the difference voltage on said voltage responsive means to said switch means to close the same when the voltage across said load current responsive means is greater than the voltage across said voltage responsive means, means for connecting said switch means to the D.-C. source of said oscillator to energize and de-energize said oscillator in accordance with the conducting condition of said switch means.

5. The combination with a frequency generator adapted to operate from a D.-C. source, an oscillator having an input connected to an energizing source, an amplifier, an output transformer provided with primary and secondary windings and means for connecting the output of the oscillator across the primary winding of said output transformer through said amplifier; of a control circuit including output voltage responsive means having poled terminals, asymmetric conducting means connected between one of said secondary windings and said output voltage responsive means to supply energy thereto, load current responsive means connected in series with the current path in said amplifier, switch means including power terminals and a control terminal, means connecting one of said poled terminals to said load current responsive means, whereby a difference voltage is produced at the other of said poled terminals, means connecting the other of said poled terminals to said control terminal of said switch means to close the same when the voltage across said load current responsive means rises to greater than the voltage across said voltage responsive means, means connecting the power terminals of said switch means across said D.-C. oscillator energizing source to energize and de-energize said oscillator in accordance with the conducting condition of said switch means, means for connecting said oscillator energizing source between said load current responsive means and said oscillator whereby the output thereof varies in accordance with changes in the voltage across said load current responsive means.

6. In a frequency generator, an oscillator, an output transformer having a primary and secondary windings and an amplifier, a load being connected across one of said secondary windings, means for connecting said oscillator across the primary winding of said output transformer through said amplifier, a control circuit, said control circuit including output voltage responsive means and load current responsive means, unilateral conducting means connected between another of said secondary windings and said output voltage responsive means to supply a voltage thereto, means for connecting said load current responsive means in series with the current path in said amplifier, means for connecting said voltage responsive means and said load current responsive means in voltage opposing relationship to produce a difference voltage in said control circuit, switch means, means for connecting said switch means to said oscillator to energize and de-energize the same in accordance with the conducting condition of said switch means, means for connecting said control circuit to said switch means to vary the conducting condition thereof in accordance with change in load current and change in output voltage whereby the oscillator is de-energized when the impedance of said load falls below a predetermined value.

7. The combination in a frequency generator adapted to operate from a D.-C. source and having an oscillator, an amplifier, an output transformer provided with a primary and secondary windings and means for connecting the output of the oscillator across the primary winding of said output transformer through said amplifier; of a control circuit including output voltage responsive means, unilateral conducting means, means for connecting said output voltage responsive means to one of said secondary windings through said unilateral conducting means, load current responsive means and switch means, means for connecting said load current responsive means in the current path in said amplifier, means for connecting said voltage responsive means in series with said load current responsive means, to produce a resultant voltage on said output voltage responsive means, means for connecting said voltage responsive means to said switch means to close the same when the voltage across said voltage responsive means is less than the voltage across said load current responsive means, means for connecting said switch means to said oscillator to energize and de-energize said oscillator in accordance with the conducting condition of said switch means, means for connecting said load current responsive means to said oscillator, said means including a unidirectional voltage source whereby the output of said oscillator varies with changes in the voltage across said load current responsive means.

8. The combination with a frequency generator adapted to operate from a D.-C. source and including an oscillator having an input connected to an energizing source, an output transformer provided with a primary winding and secondary windings, an amplifier and means for connecting the output of said oscillator across the primary winding on said output transformer through said amplifier; of a control circuit section including voltage responsive means comprising one of said secondary windings and unidirectional means, means for connecting said unidirectional means to said secondary winding to provide a poled D.-C. output from said voltage responsive means, load current responsive means connected in series with the current path in said amplifier, means for connecting one pole of said D.-C. output of said voltage responsive means to said load current responsive means to produce a resultant voltage at the other pole of said output voltage responsive means, switch means, means for connecting the other pole of said D.-C. output of said voltage responsive means to said switch means to close the same when the voltage across said load current responsive means is greater than the voltage across said voltage responsive means, means for connecting said switch means to the energizing source of said oscillator to energize and de-energize said oscillator in accordance with the conducting condition of said switch means, means for connecting said load current responsive means to said oscillator input through said energizing source to vary the output of the same in accordance with changes in the voltage across said load current responsive means.

9. The combination with a frequency generator adapted to operate from a D.-C. source and having an oscillator, a driver section, a power section, an output transformer provided with a primary and secondary windings, and means for connecting the output of the oscillator across the primary winding of said output transformer through said driver and power sections; of a negative feedback winding, means for connecting said feedback winding in voltage opposing relationship to the output voltage of said driver section for controlling the output thereof in accordance with voltage changes across said feedback means, a control circuit section including output voltage responsive means, load current responsive means series connected with said voltage responsive means to produce a difference voltage, switch means, means connected between one of said secondary windings and said output voltage responsive means to supply unidirectional current thereto, means for connecting said load current responsive means in the current path in said power section, means for connecting said voltage responsive means to said switch means to close the same when the voltage across said voltage responsive means is less than the voltage across said current responsive means, a unidirectional voltage source, means for connecting said switch means to said oscillator to energize and de-energize the same in accordance with the conducting condition of said switch means, and means for connecting said unidirectional voltage source between said load current responsive means and said oscillator to vary the output of said oscillator in accordance with the voltage across said load current responsive means.

10. In a frequency generator, an oscillator, an output transformer having a primary and secondary windings and an amplifier, means for connecting said oscillator across the primary winding through said amplifier, a control circuit, said control circuit including output voltage responsive means and load current responsive means, rectifying means connected between one of said secondary windings in said output voltage responsive means to supply energizing voltage thereto, means for connecting said load current responsive means in the current path in said amplifier, means for connecting said voltage responsive means and said load current responsive means in voltage opposing relationship to produce a difference voltage on said output voltage responsive means, switch means, means for connecting said switch means to said oscillator to control the output of said oscillator in accordance with the conducting condition of said switch means and connecting means between said control circuit and said switch means to vary the conducting condition of said switch means in accordance with change in load current and change in output voltage whereby the oscillator output is reduced when the impedance of a load connected across one of said secondary windings falls below a predetermined value, a capacitor, means for connecting said capacitor between said output voltage responsive means and one end of said load current responsive means, said capacitor being adapted to be charged by said control circuit and to discharge into said switch means to vary the conducting condition of said switch means after said load impedance falls below said predetermined value.

11. The combination with a frequency generator adapted to operate from a poled D.-C. source and having an oscillator, an amplifier driven from said oscillator, and an output transformer having a primary and secondary windings; of a control circuit including a rectifier connected to one of said secondary windings to be energized proportionally to the output voltage of the generator, first resistive means connected to said rectifier whereby said first resistive means is energized from said rectifier, second resistive means serially connected between one pole of the D.-C. source and the amplifier, poled energizing means for energizing the oscillator with a D.-C. potential, connecting means connected between said second resistive means and one pole of said energizing means for increasing said potential by adding to it voltage from said second resistive means, means for connecting the other pole of said energizing means to the oscillator to supply voltage thereto, semi-conductor means having power electrodes and a control electrode and having said power electrodes connected between said means for connecting said other pole of said energizing means to the oscillator and said one pole of said D.-C. source, means for connecting said first and second resistive means in series circuit relationship with said control electrode and one of said power electrodes whereby said semi-conductor means is rendered substantially non-conducting by voltage from said first resistive means and rendered conducting when the voltage across said second resistive means exceeds said voltage from said first resistive means to substantially reduce the energization of said oscillator as the impedance of a load connected to the output transformer falls below a predetermined value and to restore the energization of the oscillator as the load again rises above said predetermined value.

References Cited by the Examiner

UNITED STATES PATENTS

| | | | |
|---|---|---|---|
| 2,950,446 | 8/60 | Humez et al. | 331—113 |
| 2,968,738 | 1/61 | Pintell | 331—109 |
| 3,004,206 | 10/61 | Sheffet | 331—113 |
| 3,047,736 | 7/62 | Dornhoefer | 331—113 X |

FOREIGN PATENTS

| | | |
|---|---|---|
| 876,042 | 8/61 | Great Britain. |

ROY LAKE, *Primary Examiner.*

JOHN KOMINSKI, *Examiner.*